(12) United States Patent  
Richter et al.

(10) Patent No.: US 8,552,579 B2  
(45) Date of Patent: Oct. 8, 2013

(54) WIND POWER PLANT

(76) Inventors: Patrick Richter, Zurich (CH); Karl Bahnmuller, Dietikon (CH)

(*) Notice: Subject to any disclaimer, the term of this patent is extended or adjusted under 35 U.S.C. 154(b) by 476 days.

(21) Appl. No.: 12/811,133

(22) PCT Filed: Dec. 24, 2008

(86) PCT No.: PCT/CH2008/000549  
§ 371 (c)(1),  
(2), (4) Date: Jun. 29, 2010

(87) PCT Pub. No.: WO2009/086648  
PCT Pub. Date: Jul. 16, 2009

(65) Prior Publication Data  
US 2010/0283254 A1 Nov. 11, 2010

(30) Foreign Application Priority Data

Jan. 4, 2008 (CH) .............................. 8/08

(51) Int. Cl.  
*F03D 9/00* (2006.01)  
*H02P 9/04* (2006.01)  
*F03B 13/00* (2006.01)

(52) U.S. Cl.  
USPC ................................. 290/55; 290/44; 290/54

(58) Field of Classification Search  
USPC ................................. 290/44, 54, 55  
See application file for complete search history.

(56) References Cited

U.S. PATENT DOCUMENTS

| | | | | |
|---|---|---|---|---|
| 158,676 A * | 1/1875 | Chesebrough | ............... | 417/147 |
| 293,509 A * | 2/1884 | Petersen | .................... | 416/119 |
| 320,482 A * | 6/1885 | Leavitt | ....................... | 137/121 |
| 485,933 A * | 11/1892 | Herman | ...................... | 416/119 |
| 537,494 A * | 4/1895 | Stevens et al. | ............... | 415/164 |
| 1,147,646 A * | 7/1915 | Robbins | ..................... | 417/214 |
| 1,190,629 A * | 7/1916 | Clade | .......................... | 416/108 |
| 1,369,596 A * | 2/1921 | Yanacopoulos | .............. | 417/336 |
| 2,112,633 A * | 3/1938 | Moon | ........................... | 290/55 |
| 2,454,058 A * | 11/1948 | Hays | ............................. | 60/398 |
| 2,539,862 A * | 1/1951 | Rushing | ....................... | 62/230 |
| 3,806,733 A * | 4/1974 | Haanen | ......................... | 290/55 |
| 3,938,907 A * | 2/1976 | Magoveny et al. | ............. | 415/141 |
| 3,995,170 A * | 11/1976 | Graybill | ....................... | 290/55 |
| 4,039,849 A * | 8/1977 | Mater et al. | ................... | 290/55 |
| 4,047,834 A * | 9/1977 | Magoveny et al. | .......... | 415/53.1 |
| 4,052,134 A * | 10/1977 | Rumsey | ..................... | 416/119 |
| 4,055,950 A * | 11/1977 | Grossman | .................... | 60/398 |

(Continued)

FOREIGN PATENT DOCUMENTS

| CN | 1351228 A | 5/2002 |
|---|---|---|
| CN | 1484734 A | 3/2004 |

(Continued)

*Primary Examiner* — Pedro J Cuevas  
(74) *Attorney, Agent, or Firm* — The Webb Law Firm

(57) ABSTRACT

The invention relates to a wind power plant, comprising a rotor that can be rotated about a vertical axis, said rotor between two horizontal bearing planes disposed at a distance on top of each other comprising a plurality of rotor blades, which are disposed distributed on a circumferential circle, can each be pivoted about a vertical pivot axis, and the pivot range of which is delimited on both sides by a stop. In such a wind power plant, an improvement in the energy yield, while simultaneously ensuring another operation, is enabled in that the width of the rotor blades is smaller than approximately ⅓ the radius of the circumferential circle.

20 Claims, 8 Drawing Sheets

(56) References Cited

U.S. PATENT DOCUMENTS

| | | | |
|---|---|---|---|
| 4,132,282 A * | 1/1979 | Sparks | 180/2.2 |
| 4,143,522 A * | 3/1979 | Hamrick et al. | 62/324.1 |
| 4,206,608 A * | 6/1980 | Bell | 60/698 |
| 4,229,661 A * | 10/1980 | Mead et al. | 290/44 |
| 4,236,866 A * | 12/1980 | Zapata Martinez | 415/4.4 |
| 4,276,816 A * | 7/1981 | Tuley | 454/101 |
| 4,309,146 A * | 1/1982 | Hein et al. | 415/4.4 |
| 4,358,250 A * | 11/1982 | Payne | 417/302 |
| 4,447,738 A * | 5/1984 | Allison | 290/44 |
| 4,457,666 A * | 7/1984 | Selman, Jr. | 415/203 |
| 4,476,851 A * | 10/1984 | Brugger et al. | 126/247 |
| 4,486,143 A * | 12/1984 | McVey | 415/164 |
| 4,609,827 A * | 9/1986 | Nepple | 290/44 |
| 4,618,312 A * | 10/1986 | Williams | 416/119 |
| 4,619,585 A * | 10/1986 | Storm | 416/132 B |
| 4,648,801 A * | 3/1987 | Wilson | 416/171 |
| 4,659,940 A | 4/1987 | Shepard | 290/55 |
| 4,832,569 A * | 5/1989 | Samuelsen et al. | 416/17 |
| 4,834,610 A * | 5/1989 | Bond, III | 415/53.3 |
| 4,970,404 A * | 11/1990 | Barger | 290/55 |
| 5,038,049 A * | 8/1991 | Kato | 290/55 |
| 5,057,696 A * | 10/1991 | Thomas | 290/44 |
| 5,098,264 A * | 3/1992 | Lew | 418/23 |
| 5,126,584 A * | 6/1992 | Ouellet | 290/55 |
| 5,380,149 A * | 1/1995 | Valsamidis | 415/2.1 |
| 5,384,489 A * | 1/1995 | Bellac | 290/44 |
| 5,391,926 A * | 2/1995 | Staley et al. | 290/55 |
| 5,463,257 A * | 10/1995 | Yea | 290/55 |
| 5,503,530 A * | 4/1996 | Walters | 416/197 A |
| 5,553,996 A * | 9/1996 | Farrar | 415/2.1 |
| 5,664,418 A * | 9/1997 | Walters | 60/398 |
| 6,158,953 A * | 12/2000 | Lamont | 415/4.4 |
| 6,634,855 B1 * | 10/2003 | Rollo | 415/206 |
| 6,638,005 B2 * | 10/2003 | Holter et al. | 415/4.2 |
| 6,974,309 B2 | 12/2005 | Seki | 416/227 R |
| 7,023,104 B2 * | 4/2006 | Kobashikawa et al. | 290/42 |
| 7,215,037 B2 * | 5/2007 | Scalzi | 290/55 |
| 7,319,279 B2 * | 1/2008 | Korner | 290/55 |
| 7,323,791 B2 * | 1/2008 | Jonsson | 290/55 |
| 7,329,965 B2 * | 2/2008 | Roberts et al. | 290/55 |
| 7,385,302 B2 * | 6/2008 | Jonsson | 290/54 |
| 7,425,776 B2 * | 9/2008 | Ketcham | 290/55 |
| 7,550,865 B2 * | 6/2009 | Jonsson | 290/55 |
| 7,573,148 B2 * | 8/2009 | Nica | 290/55 |
| 7,719,127 B2 * | 5/2010 | Bertolotti | 290/44 |
| 7,726,934 B2 * | 6/2010 | Cowan | 415/4.2 |
| 7,758,299 B1 * | 7/2010 | Jarecki | 415/4.2 |
| 7,816,802 B2 * | 10/2010 | Green | 290/55 |
| 7,969,036 B2 * | 6/2011 | Chung | 290/55 |
| 8,013,569 B2 * | 9/2011 | Hartman | 320/109 |
| 8,198,748 B1 * | 6/2012 | Korzen | 290/55 |
| 8,217,526 B2 * | 7/2012 | Devitt | 290/55 |
| 8,257,018 B2 * | 9/2012 | Coffey | 415/4.2 |
| 2002/0109358 A1 * | 8/2002 | Roberts | 290/54 |
| 2002/0144504 A1 * | 10/2002 | Merswolke et al. | 60/398 |
| 2003/0122380 A1 * | 7/2003 | Harbison | 290/55 |
| 2003/0133782 A1 * | 7/2003 | Holter et al. | 415/4.2 |
| 2005/0275225 A1 * | 12/2005 | Bertolotti | 290/44 |
| 2006/0275105 A1 * | 12/2006 | Roberts et al. | 415/4.2 |
| 2007/0095069 A1 * | 5/2007 | Joshi et al. | 60/772 |
| 2008/0050234 A1 * | 2/2008 | Ingersoll et al. | 416/132 B |
| 2010/0107621 A1 * | 5/2010 | Garvey | 60/327 |
| 2010/0187831 A1 * | 7/2010 | Bertolotti | 290/55 |
| 2010/0225266 A1 * | 9/2010 | Hartman | 320/101 |
| 2011/0027062 A1 * | 2/2011 | Moore et al. | 415/1 |
| 2011/0173980 A1 * | 7/2011 | Yangpichit | 60/641.12 |
| 2011/0236181 A1 * | 9/2011 | Wygnanski | 415/1 |

FOREIGN PATENT DOCUMENTS

| | | |
|---|---|---|
| DE | 121755 | 10/1899 |
| DE | 102004001573 A1 | 8/2005 |
| DE | 102004061369 A1 | 7/2006 |
| EP | 1273798 A1 | 1/2003 |
| JP | 2005188494 A | 7/2005 |
| RU | 2088799 C1 | 8/1997 |
| WO | 9720142 A1 | 6/1997 |
| WO | 2005046638 A2 | 5/2005 |

* cited by examiner

WIND POWER PLANT

TECHNICAL FIELD

The present invention relates to the field of alternative energy production by means of wind power.

DESCRIPTION OF RELATED ART

Wind power installations, that is to say installations for obtaining (electrical) energy from the wind, have been known for a long time in widely differing forms and embodiments. One fundamental distinguishing feature between such wind power installations, which normally have a rotor which rotates about a rotation axis, is the spatial arrangement of the rotation axis: in the case of so-called vertical rotors, the rotor rotates about a vertical axis, while in the case of horizontal rotors, the rotor rotates about a horizontal rotation axis. Vertical rotors, which also include the wind power installation according to the present invention, have the particular advantage over horizontal rotors that they do not need to be adjusted for a specific wind direction.

In principle, the power contained in the wind at a wind speed v is proportional to the cube of the wind speed v. The power extracted by the wind power installation increasingly reduces the wind speed. In the extreme (v→0), the power extracted tends to 0, because there is no longer any flow through the rotor. There is therefore a maximum possible power that can be extracted, which is about 60% of the power contained in the wind.

The power which can be extracted from the wind is governed in particular by the nature of the rotor: the rotors of wind power installations are equipped with rotor blades on which two types of forces can act in the wind flow, specifically a force in the flow direction caused by the drag of the rotor blade and a lift force which acts transversely with respect to the flow direction, for example as is used in the case of aircraft wings.

The present invention relates to wind power installations which are based mainly or exclusively on the drag (drag rotors). They are distinguished by a high rotor torque which is available even during starting. WO A2-2005/046638 discloses a wind power installation which is in the form of a vertical rotor based on the drag principle and can have a number of stages in height. This wind power installation has the disadvantage that a comparatively small number of broad rotor blades are used, which can be pivoted only in a very restricted pivoting range of about 45° about their pivoting axis. In consequence, the energy obtained is not optimal. At the same time, its structure is considerably loaded by the pivoting movements and must be designed to be particularly robust.

JP-A-2005188494 discloses a wind power installation which is in the form of a vertical rotor based on the drag principle or the lift principle and whose rotor blades admittedly have a pivoting range of up to 180°, but whose rotor blades are so broad that only a small number (four or six) can be arranged on the circumferential circle which is provided for the pivoting axes. In this case as well, the yield is not optimal, and the rotor running is particularly rough, and subject to large disturbance forces.

SUMMARY OF THE INVENTION

The object of the invention is therefore to design a wind power installation of the type mentioned initially which avoids the disadvantages of known installations and results in more energy being obtained while at the same time decreasing the mechanical load on the structure. In one embodiment, the width of the rotor blades is chosen to be small, and is less than approximately ⅓ of the radius of the circumferential circle. The narrow rotor blades result in various advantages:

- More rotor blades with a comparatively large pivoting range can be arranged on the circumferential circle, which more effectively convert, and therefore utilize, the wind flow passing through the rotor volume to torque.
- The load on the individual rotor blades is less, as a result of which they can pivot more easily to the optimum position, and produce reduced disturbance forces during pivoting and when striking the limit stops of the pivoting range.
- If the wind pressure on the rotor blades is not reduced by reducing the width, the rotor blades can be made longer (in the vertical direction) in order to achieve the same rotor area. The torque is thus increased in comparison to broad rotor blades, because the blade area is located further outward, overall.
- The pivoting processes of the rotor blades are distributed between considerably more pivoting axes on the circumferential circle, which leads to smoother running of the rotor and to a reduced load on the bearings and on the load-bearing structure.

One preferred refinement of the invention is distinguished in that twelve or more rotor blades are arranged such that they can pivot on the circumferential circle of the rotor.

The installation design is particularly simple if the rotor blades are in this case in the form of straight blades. Dispensing with an airfoil profile or the like for the rotor blades considerably simplifies production, and thus reduces the production costs.

If, according to another refinement, the rotor blades each have a leading edge and a trailing edge, and have a reduced thickness between the leading edge and the trailing edge, the weight of the rotor blades and the magnitude of the disturbance forces produced by them can be further reduced without adversely affecting robustness.

If, on the other hand, the rotor blades have an aerodynamic cross-sectional profile, preferably in the form of a stretched droplet, with a pointed end and a round end, the rotor blades encounter less drag in the wind during their movement against the wind, thus increasing the overall power yield of the installation.

The pivoting range of the rotor blades is preferably in each case limited to an angle of about 100°. This allows optimum matching of the rotor blades to the respective rotor position without any excessive forces occurring on striking the limit points of the pivoting range.

It is particularly advantageous when, according to another refinement of the invention, in one limit position of the pivoting range, the rotor blades each include an angle of about 50° with the radius vector of the circumferential circle which passes through the pivoting axis, and, in the other limit position of the pivoting range, include an angle of about 150-165°.

One simple option for defining the pivoting range consists in that the pivoting axes of the rotor blades are arranged within the rotor blades, in the vicinity of, but at a distance from, the leading edge, and in that the pivoting range of the rotor blades is in each case defined by a single stop which is arranged within the circumferential circle.

However, it is also feasible for the pivoting axes of the rotor blades to be arranged in the leading edges of the rotor blades, and for the pivoting range of the rotor blades to be defined in each case by a limiting element which is in the form of a circular arc, concentrically surrounds the pivoting axis, and whose ends each form a stop.

If the aim is to design the installation to be particularly lightweight, it is advantageous for the mounting planes to be formed by spoked wheels which rotate about the axis.

In order to ensure that the wind pressure on the individual rotor blades does not become excessive, it is expedient for the wind power installation to have a plurality of rotors which are arranged at different heights. This can be done without consuming a relatively large area, by arranging the rotors one above the other, and by them rotating about the same axis.

In particular, in this case, different wind speeds can be utilized better at different heights, if the rotors can rotate independently of one another.

If the rotor blades have an aerodynamic cross-sectional profile, preferably in the form of a stretched droplet, with a pointed end and a round end, it is advantageous for the pivoting axes of the rotor blades to be arranged within the rotor blades in the vicinity of, but at a distance from, the round end, and for the pivoting range of the rotor blades each to be defined by a single stop which is arranged within the rotor blade, rotationally fixed with respect to the pivoting axis.

The power can be tapped off in a particularly simple and advantageous manner if the rotor drives at least one compressor via a power transmission, which compressor sucks in air on the input side and is connected on the output side to a compressed-air reservoir, and in that a turbine can be connected to the compressed-air reservoir and drives a generator in order to produce electricity.

For better matching to different wind strengths, it is advantageous if the rotor can be selectively connected to a plurality of compressors via power transmission. When the wind strength rises, compressors can be additionally connected in order to process the additional power, and vice versa.

The wind power installation is particularly compact if the compressed-air reservoir is incorporated in the ground, and forms the foundation of the wind power installation arranged above it.

DESCRIPTION OF THE DRAWINGS

The invention will be explained in more detail in the following text with reference to exemplary embodiments and in conjunction with the drawing, in which.

DESCRIPTION OF THE PREFERRED EMBODIMENTS

Figure 1:
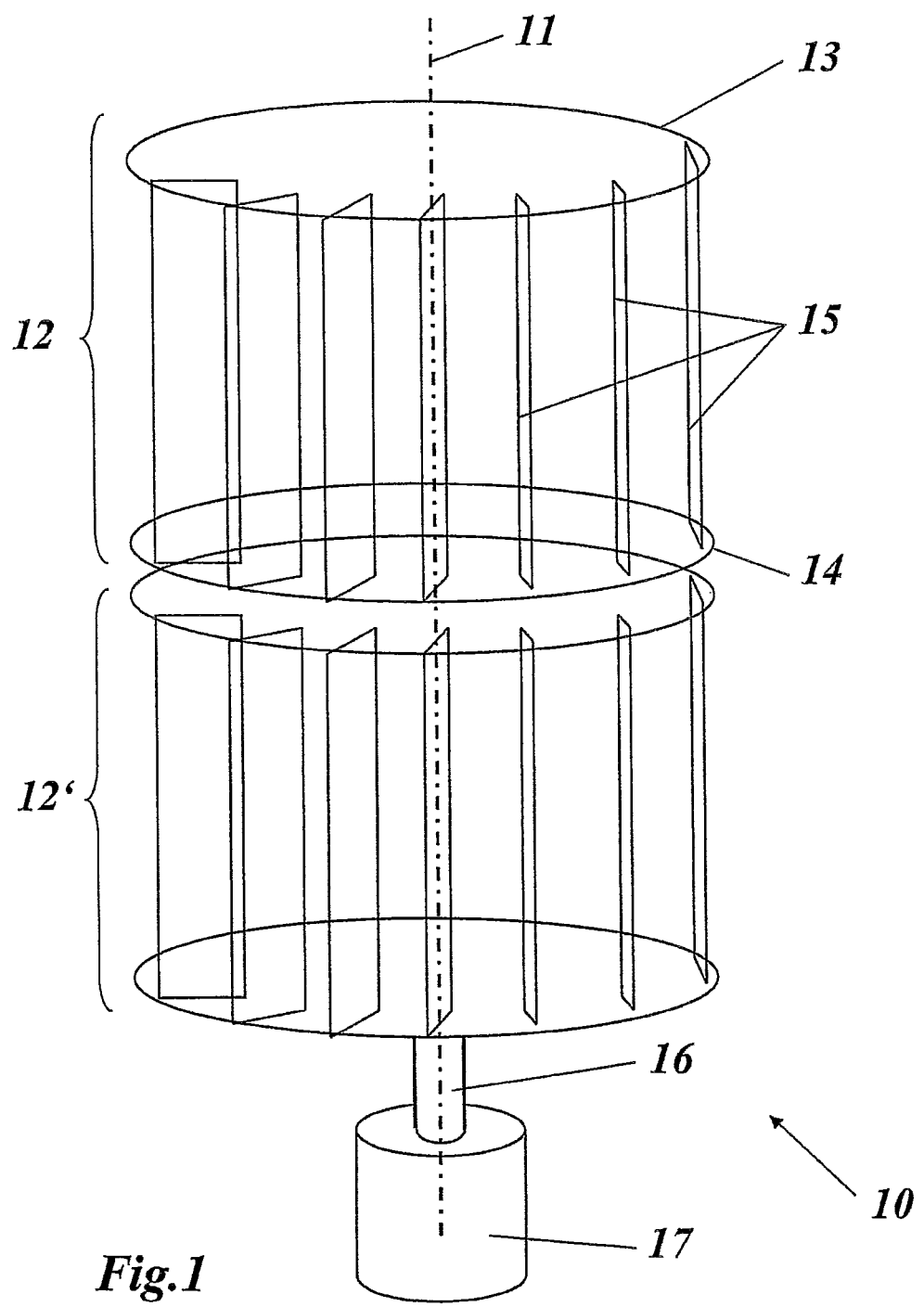
FIG. 1 shows a highly simplified schematic illustration of a wind power installation in the form of a vertical rotor, based on the drag principle, with two rotors one above the other, as is suitable for implementation of the invention.

FIG. 1 shows a highly simplified schematic illustration of a wind power installation in the form of a vertical rotor based on the drag principle and having two rotors one above the other, as is suitable for implementation of the invention. The wind power installation 10 has a vertical axis 11 about which two rotors 12 and 12' rotate. Further rotors may, of course, also be provided, which rotate about the axis 11. However, it is just as possible to provide only a single rotor 12. The rotor or rotors 12, 12' is or are connected via a shaft 16 to a generator unit 17, which can also contain a gearbox in order to change the rotation speed. Instead of the shaft 16, a shaft train comprising a plurality of individual shafts located concentrically one inside the other can be provided, via which the individual rotors 12, 12' are coupled to the generator unit 17 independently of their rotation. This is particularly advantageous when the aim is to optimally tap off flow strata with different wind speeds by means of rotors 12, 12' located at different heights.

Figure 2:
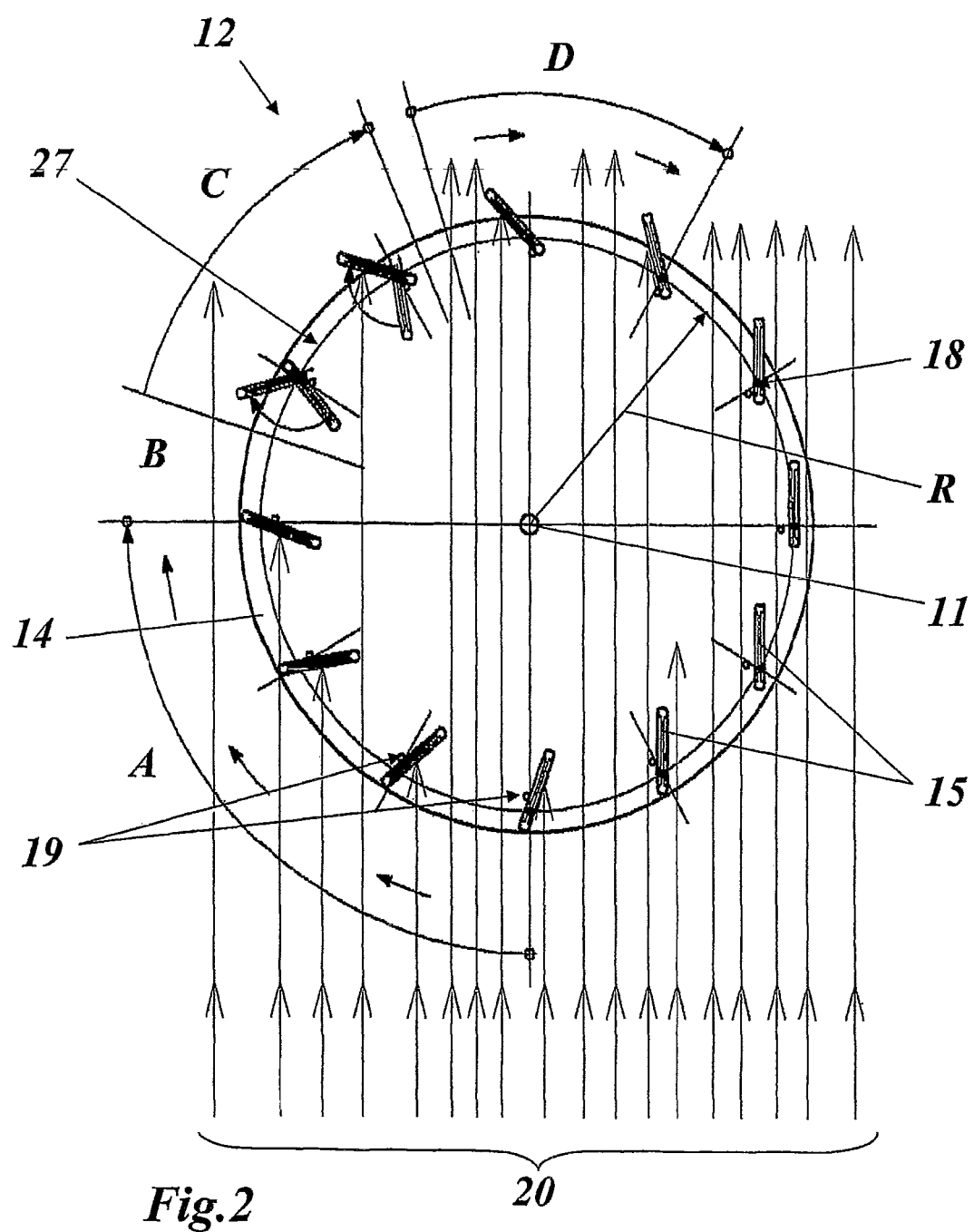
FIG. 2 shows a plan view from above of the rotor of a wind power installation according to one exemplary embodiment of the invention.

Each of the rotors 12, 12' is equipped with a plurality of vertically arranged rotor blades 15 which are mounted in a distributed manner, such that they can pivot, on a circumferential circle between a lower mounting plane 14 and an upper mounting plane 13. For the sake of simplicity and clarity, only the front rotor blades are in each case shown in FIG. 1. FIG. 2 shows a plan view from above of a rotor 12 according to one preferred exemplary embodiment of the invention, showing the interaction of the rotor 12 and of the rotor blades 15 accommodated therein, with an air flow (wind) 20. The upper mounting plane 13 is in this case omitted in order to allow the rotor blades 15 to be seen without any impediment. Overall, twelve rotor blades 15 are arranged distributed uniformly on the circumferential circle 27 and can each pivot about a vertical pivoting axis 18. The pivoting range of each rotor 15, which is shown in detail in FIG. 5 and comprises an angle β of about 100° to 115°, is in each case bounded by a single stop 19 which is in the form of a post and is placed a short distance away from the pivoting axis 18 within the circumferential circle 27.

Figure 6:
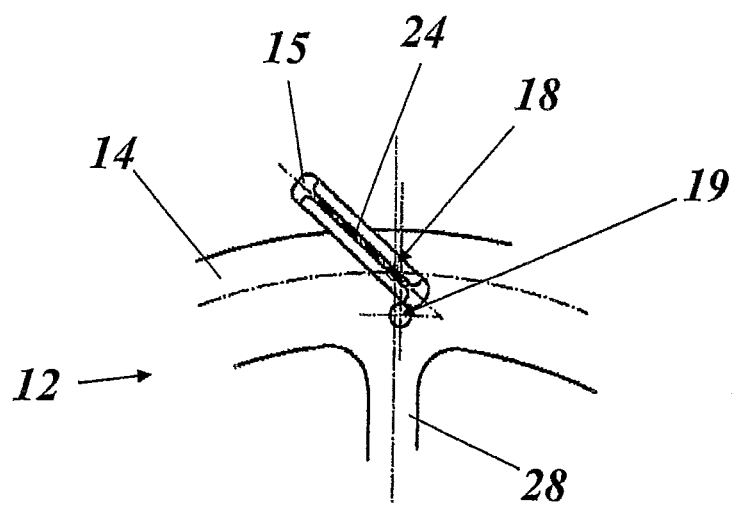
FIG. 6 shows, in detail, the design of a rotor as shown in FIG. 2 with a spoked wheel for the rotor blades to be mounted on, according to another exemplary embodiment of the invention, with the rotor blade located at one end of the pivoting range.
Figure 7:
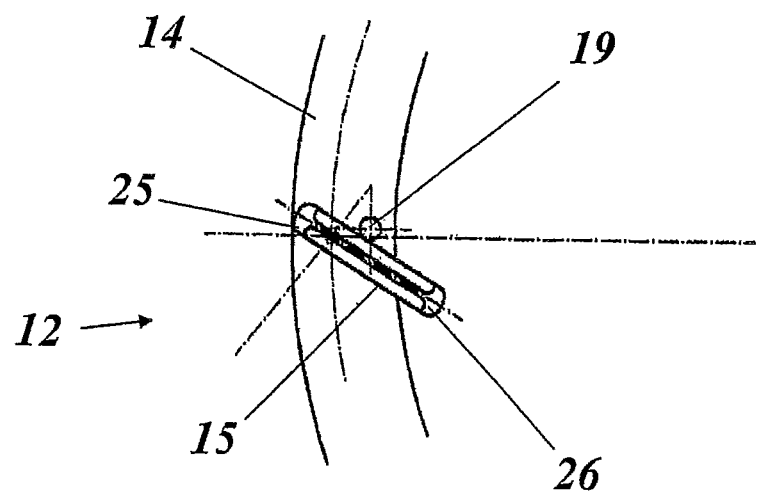
FIG. 7 shows the rotor shown in FIG. 6 with the rotor blade at the other end of the pivoting range.

Each rotor blade 15 is straight and has a leading edge 25 and a trailing edge 26 (FIG. 7). The pivoting axes 18 of the rotor blades 15 are arranged within the rotor blades 15, in the vicinity of, but at a distance from, the leading edge 25. At one limit position of the pivoting range (FIG. 6), that section of the rotor blade which is located between the pivoting axis 18 and the leading edge 25 pivots against the stop 19. In the other limit position (FIG. 7), that section of the rotor blade 15 which is located between the pivoting axis 18 and the trailing edge 26 pivots against the stop 19. As can be seen from FIG. 5, in one limit position of the pivoting range (β), the rotor blades 15 each include an angle α of about 50° with the radius vector of the circumferential circle 27 which passes through the pivoting axis 18, and in the other limit position of the pivoting range (β), include an angle 180°-γ of about 150° to 165°.

Figure 3:
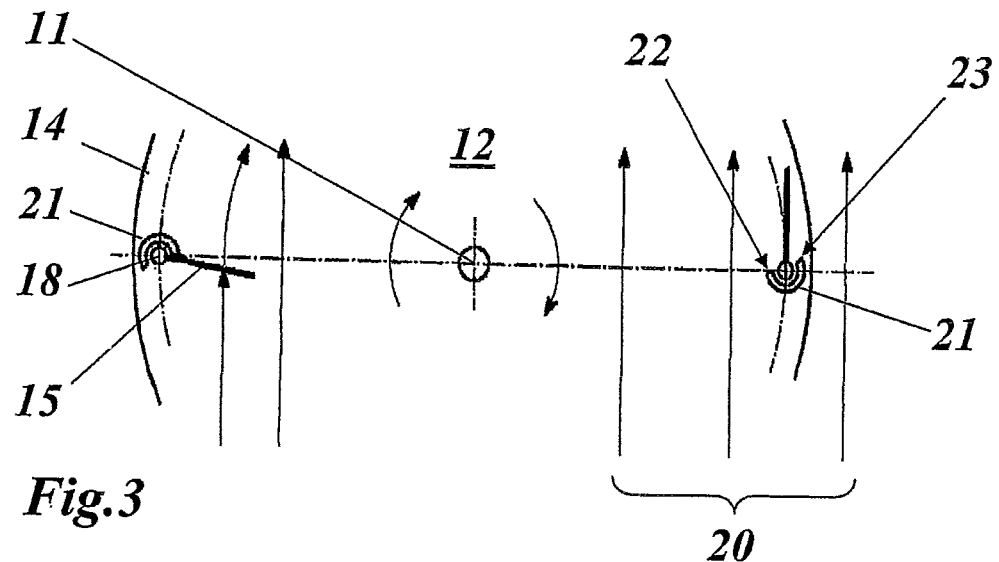
FIG. 3 shows an illustration, comparable to FIG. 2, of a detail of the rotor of a wind power installation according to another exemplary embodiment of the invention.
Figure 4:
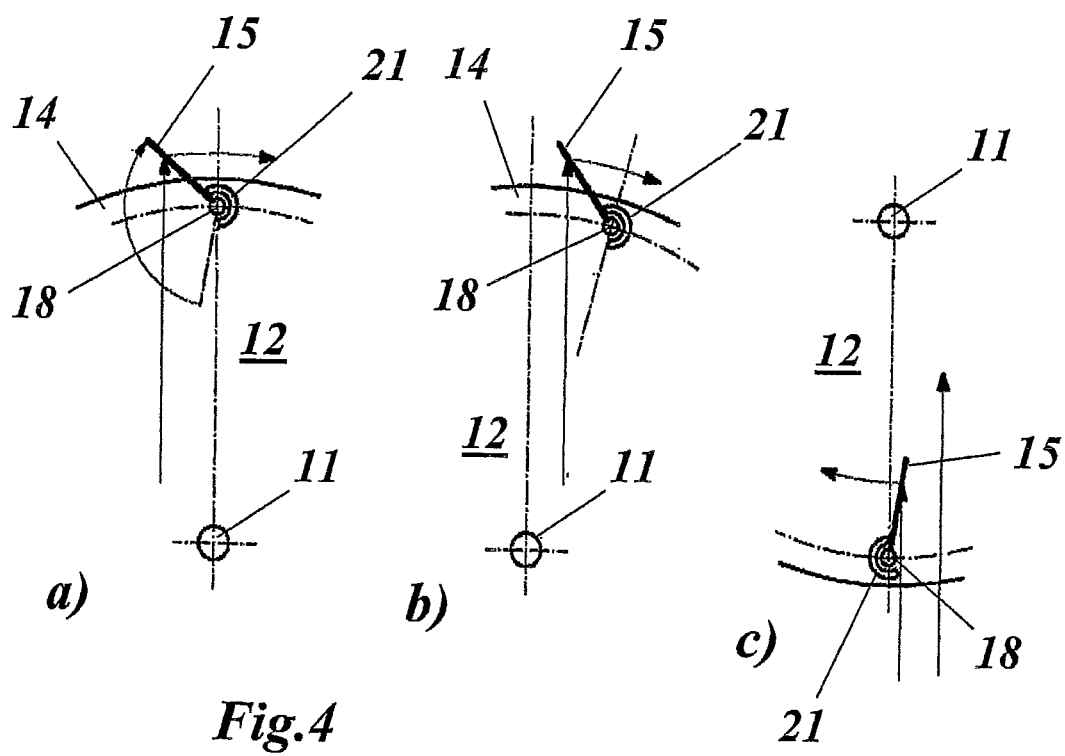
FIG. 4 uses various sub-FIGS. 4(a) to 4(c) to show various positions of a rotor blade in the rotor as shown in FIG. 3.

In another refinement, which is shown by way of example in FIGS. 3 and 4, the pivoting axes 18 of the rotor blades 15 are arranged directly in the leading edges 25 of the rotor blades 15. In this case, the pivoting range (β) of the rotor blades 15 is in each case defined by a limiting element 21 which is in the form of a circular arc and concentrically surrounds the pivoting axis 18, and whose ends each form a stop 22 and 23.

Figure 5:
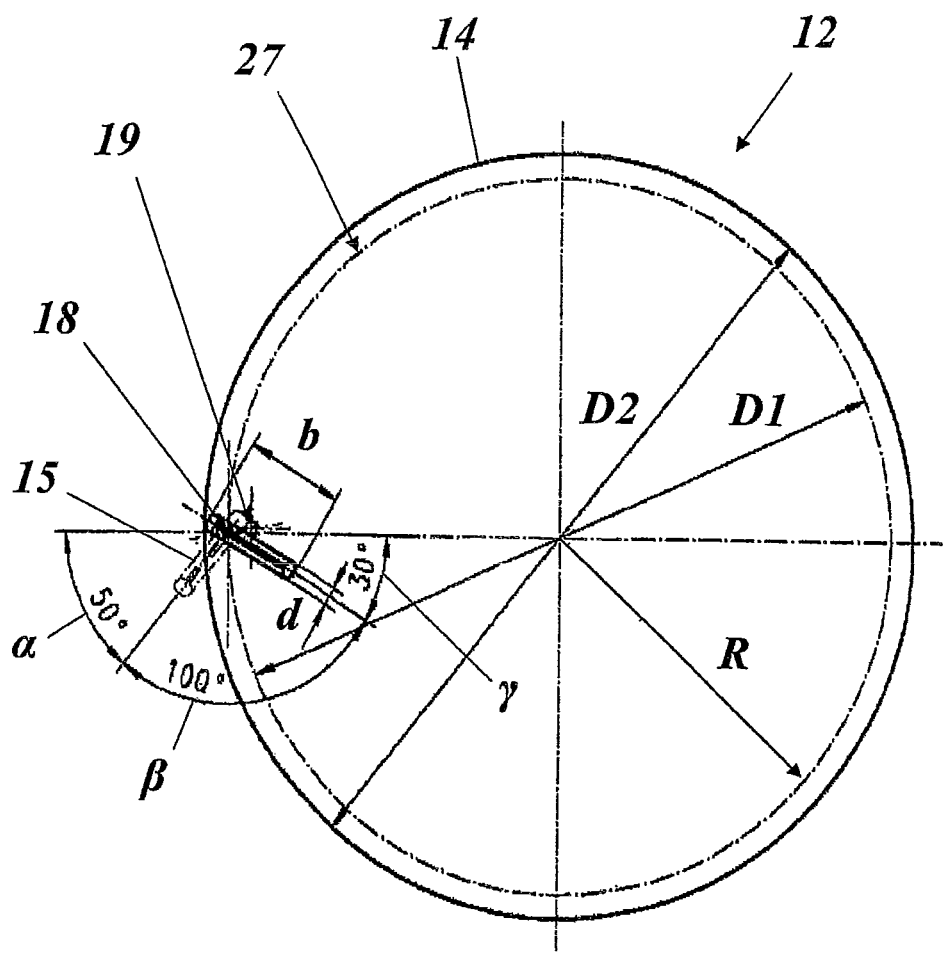
FIG. 5 shows the variables which occur in a rotor as shown in FIG. 2.

The comparatively narrow width b of the individual rotor blades 15 is essential for the invention (FIG. 5). The width b is less than approximately ⅓ of the radius R of the circumferential circle 27. This allows a comparatively large number of rotor blades 15 to be accommodated on the circumferential circle 27 without having to limit the pivoting range to do so. The interaction of the rotor 12 and of the rotor blades 15 with the air flow is thus subdivided to a greater extent, thus leading to better utilization in the volume, and to smoother running.

The size and position of the pivoting range of the rotor blades as shown in FIG. 5 are also important. When the rotor 12 is revolving in the clockwise direction as shown in FIG. 2 and with the wind direction shown there, this results in changing rotor blade positions, which can be subdivided into and associated with different angle ranges A to D: in a first angle range A, which can be referred to as the drive range, the rotor blades 15 rest on the stop 19 and are positioned transversely with respect to the air flow 20, thus resulting in a driving torque. In the angle range B, the situation with respect to the position of the rotor blade 15 is unstable, because this is where the blade starts to separate from the stop 19. In the angle range C, the rotor blade 15 pivots outward and strikes against the stop 19 from the other side. Once again, this results in a driving torque. Because of the effect of the air flow 20, a driving torque is also applied in an additional drive range (angle range D) as a result of the chosen position of the pivoting range (see also FIGS. 4a and 4b) until, later, the rotor blade is separated from the stop 19 and is positioned parallel to the air flow (right-hand side of FIG. 2 and FIG. 3) in order to enter the angle range A again even later (see also FIG. 4c).

The energy in the air flow 20 is utilized optimally by the position and size of the pivoting range of the rotor blades. The splitting of the total rotor blade area between a multiplicity of comparatively narrow rotor blades 15 also contributes to this. This splitting at the same time results in the rotor 12 running smoothly, reducing the magnitude of the disturbance forces associated with the pivoting. A further improvement can be achieved if the thickness d of the rotor blades 15 is reduced in a center area 24 between the leading edge 25 and the trailing edge 26 (FIG. 6). In addition to the weight saved in each rotor blade 15 by this measure, further weight can be saved, without any loss of strength, by forming the mounting planes 13, 14 by spoked wheels 28 which rotate about the axis 11 (FIG. 6).

Figure 8:
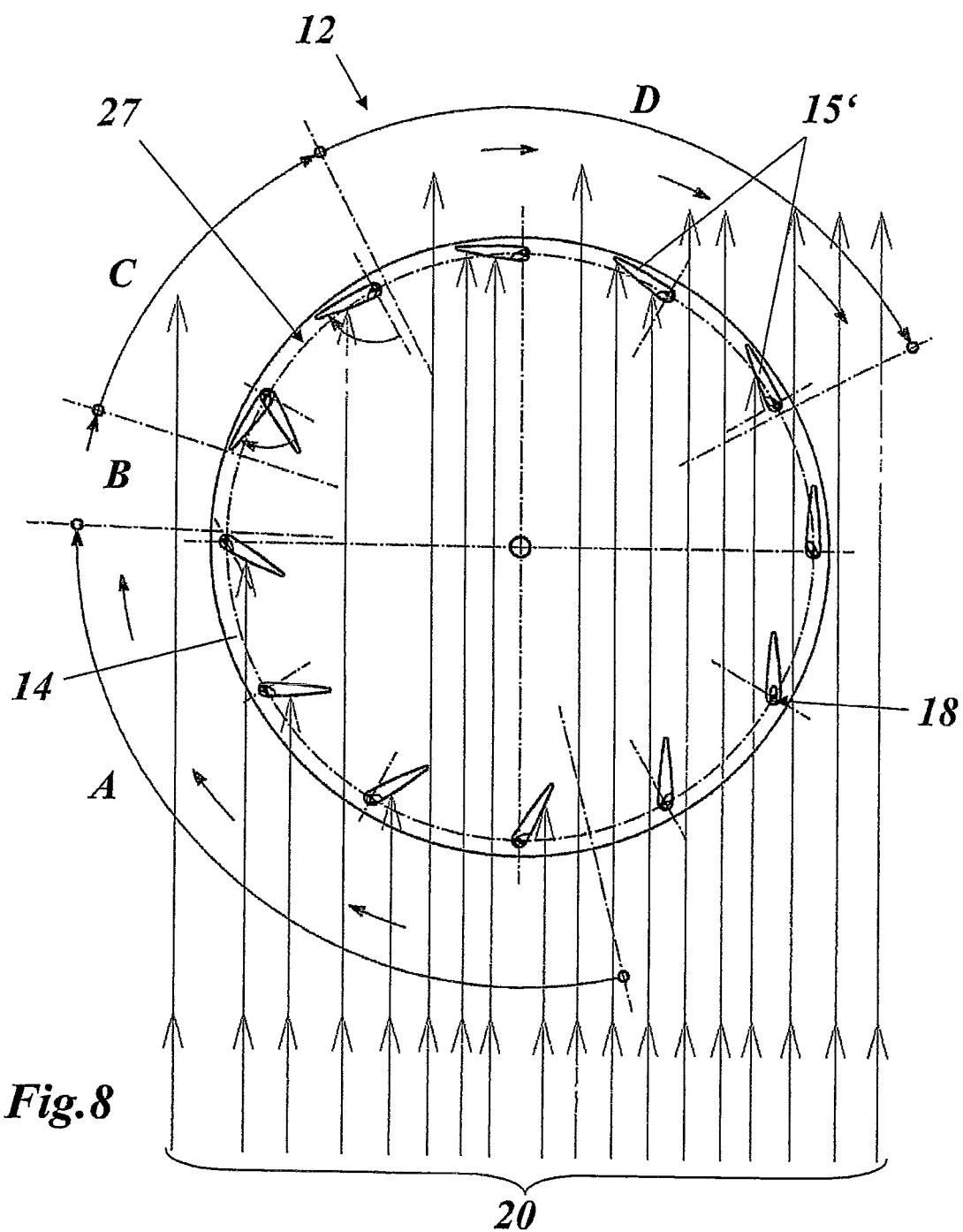
FIG. 8 uses an illustration comparable to FIG. 2 to show a rotor with aerodynamically shaped rotor blades and angle ranges extended in this way.
Figure 9:
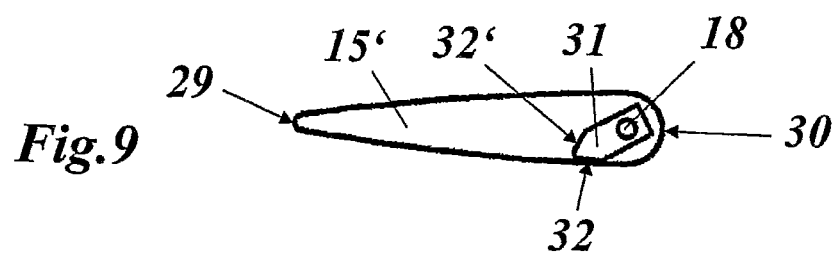
FIG. 9 shows an enlarged individual illustration of a rotor blade from FIG. 8.

However, instead of the rotor blades 15 shown in FIGS. 6 and 7, it is also possible to use aerodynamically optimized rotor blades 15' as shown in FIG. 9, which are distinguished by a cross-sectional profile in the form of a stretched droplet with a pointed end 29 and a round end 30. In this case, the pivoting axis 18 is arranged at the round end 30. A stop 31 is mounted in a rotationally fixed manner within the rotor blade 15' and has two stop surfaces 32 and 32' which are oriented at an acute angle to one another. In one limit position of the pivoting range (as shown in FIG. 9), one inner face of the rotor blade 15' rests on the lower stop surface 32. In the other limit position, when the rotor blade 15' has been pivoted about the pivoting axis 18 in the counterclockwise direction, the other inner face of the rotor blade 15' rests on the upper stop surface 32'. The internal arrangement protects the stop mechanism against external influences such as icing, dirt or damage, and at the same time improves the aerodynamics. When rotor blades 15' such as these and as shown in FIG. 8 are installed in the rotor 12, this results in angle ranges A and D which are larger than those shown in FIG. 2.

Since the wind does not blow uniformly and continuously at many sites where wind power installations are installed, it is advantageous for operational reasons to be able to store the energy that is produced easily and effectively, and to withdraw the energy from the storage again as required. The described rotor, which emits a high torque from the start as a drag rotor, is particularly highly suitable for operation of one or more compressors. When the compressors are used to suck in air and compress it, the compressed air that is produced can be stored in a compressed-air reservoir, and can drive a turbine or a compressed-air motor, which produces electricity via a flange-connected generator, as required. A wind power installation such as this according to the invention with a compressed-air reservoir is illustrated in the form of the preferred physical embodiment in FIG. 10, and in the form of a highly simplified installation layout in FIG. 11.

Figure 10:
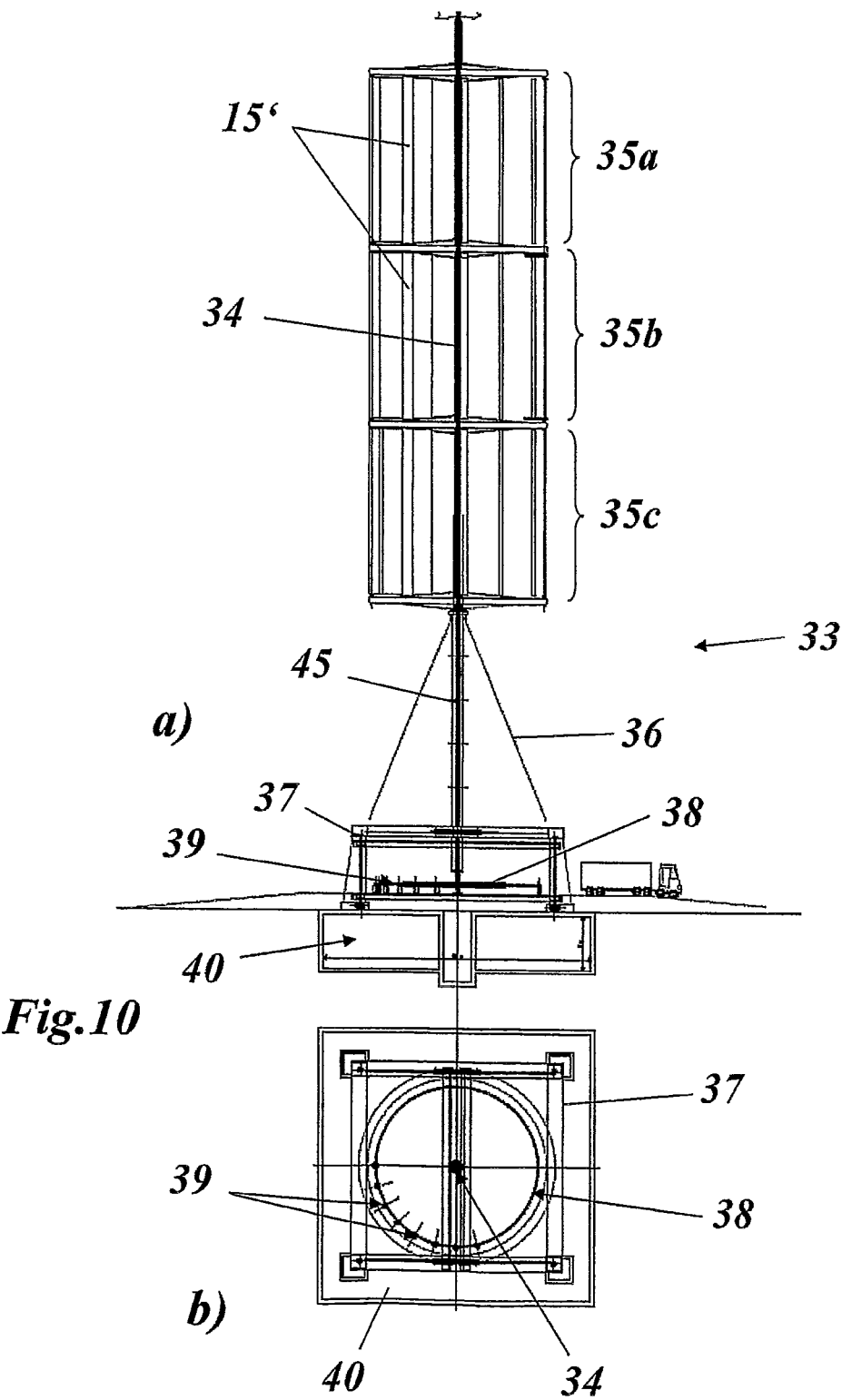
FIG. 10 shows the side view (FIG. 10a) and an axial viewing direction of a wind power installation according to another exemplary embodiment of the invention with compressed-air storage.

In the case of the wind power installation 33 shown in FIG. 10, a compressed-air reservoir 40 in the form of a container, composed of concrete by way of example, is introduced into the ground. The compressed-air reservoir at the same time acts as a foundation for the wind power installation built above it. Three rotors or cells 35a, 35b and 35c are arranged one above the other on a mast 45 with a vertical central axis 34 and are designed, for example, as shown in FIG. 8. The mast 45 is anchored in a frame 37 which is built on the foundation, and is stabilized via a side guy 36. Power transmission 38, which is connected to the rotors 35a, b, c, and is in the form of a wheel or turntable is arranged within the frame 37, via which power transmission 38 compressors 39 which are distributed on the circumference can be driven in a manner which allows them to be connected selectively.

Figure 11:
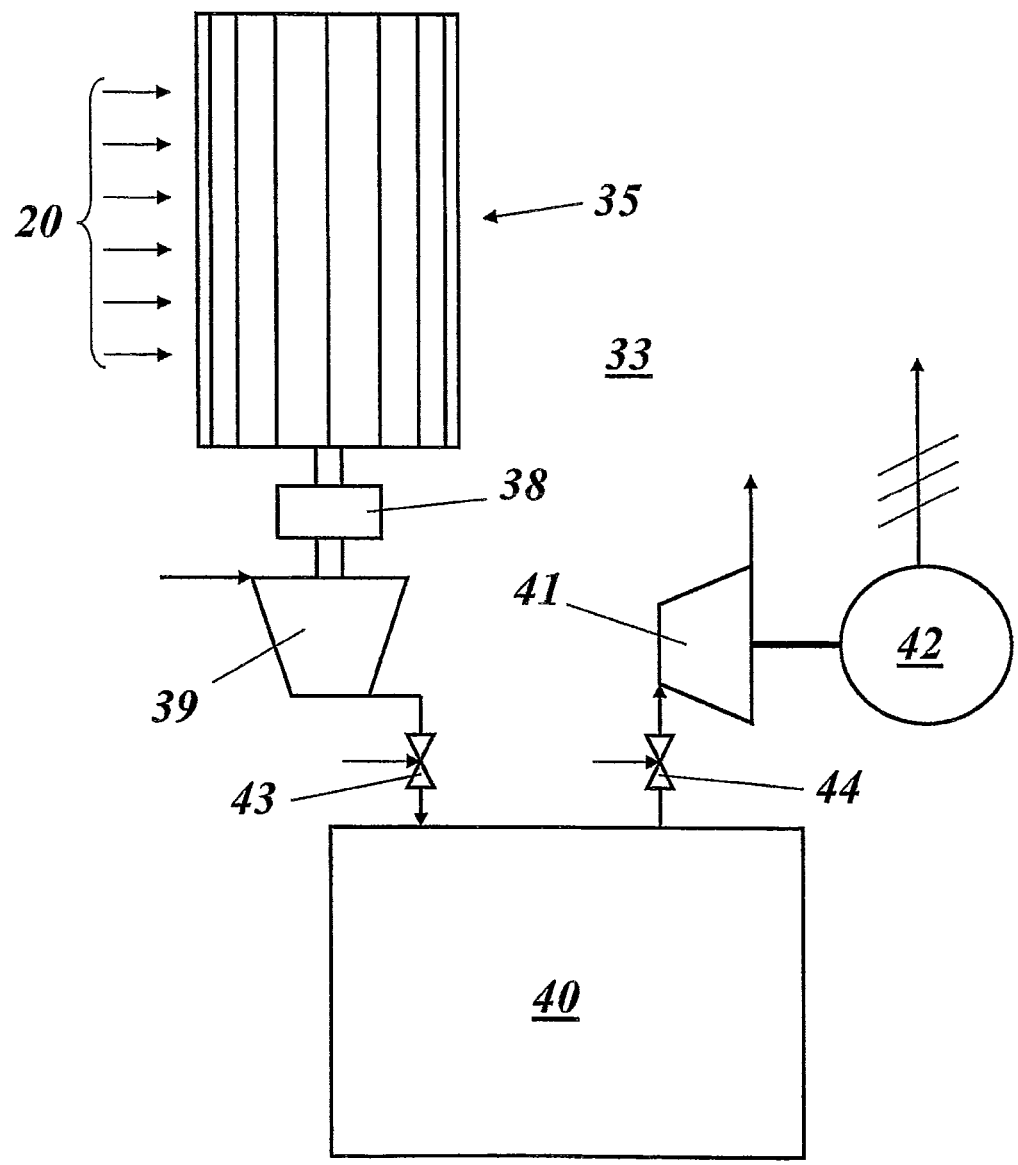
FIG. 11 shows a highly simplified installation layout for the installation shown in FIG. 10.

In the highly simplified installation layout shown in FIG. 11, the rotor 35 drives a compressor 39 via the power transmission 38, which compressor 39 sucks in air at the inlet, compresses it and emits it at the outlet via a first controllable valve 43 to the compressed-air reservoir 40. When it is intended to produce electrical energy, compressed air is taken from the compressed-air reservoir 40 via a second controllable valve 44, and is expanded in a turbine 41 (or a compressed-air motor), in order to produce work. The turbine 41 drives a generator 42 which produces three-phase electricity and—after appropriate voltage and frequency matching—emits it to a local or superordinate grid system. When compressed air is stored and taken at the same time, the compressed-air reservoir 40 is used, so to speak, as a "smoothing capacitor".

The wind power installation 33 shown in FIG. 10 has an overall height of, for example, 90 m, which is made up of 30 m for the mast 45 and 60 m for the three rotors/cells 35a, b, c, with a height of 20 m each. A mean wind speed of 5 m/s results in a power of 44 kW being produced, corresponding to 1056 kWh of energy per day. If the pressure reservoir 40 has a storage volume of 5000 m³, 1250 kWh can be stored in it at a pressure of 10 bar.

However, generators can also be arranged directly on the power transmission 38 and produce electrical power directly when required, without the interposition of the compressed-air reservoir, thus allowing the installation to be operated particularly flexibly, overall.

LIST OF REFERENCE SYMBOLS 10, 33 Wind power installation
11, 34 Axis (vertical)
12, 12' Rotor
13, 14 Mounting plane
15, 15' Rotor blade (lamellar)
16 Shaft
17 Generator unit
18 Pivoting axis (lamellar)
19, 31 Stop
20 Air flow (wind)
21 Limiting element
22, 23 Stop
24 Center area (reduced thickness)
25 Leading edge
26 Trailing edge
27 Circumferential circle
28 Spoked wheel
29, 30 End
32, 32' Stop surface
35 Rotor
35a, 35b, 35c Rotor
36 Guy
37 Frame
38 Power transmission
39 Compressor
40 Compressed-air reservoir (cavern)
41 Turbine
42 Generator
43, 44 Valve
45 Mast
A, . . . D Angle range
D1, D2 Diameter
d Thickness
b Width
R Radius (circumferential circle)
α, β, γ Angle

The invention claimed is:

1. A wind power installation comprising:
at least one rotor which can rotate about a vertical axis and, between two horizontal mounting planes, which are located one above the other and separated, a plurality of rotor blades, which are arranged distributed on a circumferential circle and can each pivot about a vertical pivoting axis extending between said two horizontal mounting planes, and whose pivoting range is bounded at both ends by a single stop, wherein the width of the rotor blades is less than ⅓ of the radius of the circumferential circle, whereby said mounting planes are formed by wheels which rotate about said vertical axis, and the at least one rotor is connected via a shaft to a generator unit.

2. The wind power installation as claimed in claim 1, wherein twelve or more rotor blades are arranged such that they can pivot on the circumferential circle of the rotor.

3. The wind power installation as claimed in claim 1, wherein the rotor blades are in the form of straijht blades.

4. The wind power installation as claimed in claim 3, wherein the rotor blades each have a leading edge and a trailing edge, and have a reduced thickness between the leading edge and the trailing edge.

5. The wind power installation as claimed in claim 4, wherein the pivoting axes of the rotor blades are arranged within the rotor blades and spaced at a distance near the leading edge.

6. The wind power installation as claimed in claim 4, wherein the pivoting axes of the rotor blades are arranged in the leading edges of the rotor blades.

7. The wind power installation as claimed in claim 1, wherein the pivoting range of the rotor blades begins from the radius vector of the circumferential circle which passes through the pivoting axis and is in each case limited to an angle in the range of 100°-115°.

8. The wind power installation as claimed in claim 7, wherein, in one limit position of the pivoting range, the rotor blades each include an angle of about 50° with the radius vector of the circumferential circle which passes through the pivoting axis, and, in the other limit position of the pivoting range, include an angle in the range of 150°-165°.

9. The wind power installation as claimed in claim 1, wherein the mounting planes are formed by spoked wheels which rotate about the axis.

10. The wind power installation as claimed in claim 1, wherein the wind power installation has a plurality of rotors which are arranged at different heights.

11. The wind power installation as claimed in claim 10, wherein the rotors are arranged one above the other and rotate about the same axis.

12. The wind power installation as claimed in claim 11, wherein the rotors can rotate independently of one another.

13. The wind power installation as claimed in claim 1, wherein the rotor blades have an aerodynamic cross-sectional profile with a pointed end and a round end.

14. The wind power installation as claimed in claim 13, wherein the aerodynamic cross-sectional profile is in the form of a stretched droplet.

15. The wind power installation as claimed in claim 1, wherein the rotor drives within said generator unit at least one compressor via a power transmission, the compressor sucks in air on the input side and is connected on the output side to a compressed-air reservoir, and wherein a turbine can be connected to the compressed-air reservoir and drives a generator in order to produce electricity.

16. The wind power installation as claimed in claim 15, wherein the rotor can be selectively connected to a plurality of compressors via power transmission.

17. The wind power installation as claimed in claim 15, wherein the compressed-air reservoir is incorporated in the ground, and forms the foundation of the wind power installation arranged above it.

18. A wind power installation comprising:
at least one rotor which can rotate about a vertical axis and, between two horizontal mounting planes, which are located one above the other and separated,
a plurality of rotor blades, which are arranged distributed on a circumferential circle and can each pivot about a vertical pivoting axis extending between said two horizontal mounting planes, and whose pivoting range is bounded at both ends by a stop,
wherein the rotor blades are in the form of straight blades;
the rotor blades each have a leading edge and a trailing edge, and have a reduced thickness between the leading edge and the trailing edge;
the width of the rotor blades is less than ⅓ of the radius of the circumferential circle;
said mounting planes are formed by wheels which rotate about said vertical axis,
the at least one rotor is connected via a shaft to a generator unit;
the pivoting axes of the rotor blades are arranged within the rotor blades and spaced at a distance near the leading edge; and the pivoting range of the rotor blades is in each case defined by a single stop which is arranged within the circumferential circle.

19. A wind power installation comprising:

at least one rotor which can rotate about a vertical axis and, between two horizontal mounting planes, which are located one above the other and separated, a plurality of rotor blades, which are arranged distributed on a circumferential circle and can each pivot about a vertical pivoting axis extending between said two horizontal mounting planes, and whose pivoting range is bounded at both ends by a stop, wherein the rotor blades are in the form of straight blades;

the rotor blades each have a leading edge and a trailing edge, and have a reduced thickness between the leading edge and the trailing edge;

the width of the rotor blades is less than ⅓ of the radius of the circumferential circle;

said mounting planes are formed by wheels which rotate about said vertical axis, the at least one rotor is connected via a shaft to a generator unit;

the pivoting axes of the rotor blades are arranged in the leading edges of the rotor blades; and the pivoting range of the rotor blades is in each case defined by a limiting element which is in the form of a circular arc, concentrically surrounds the pivoting axis, and whose ends each form a stop.

20. A wind power installation comprising:

at least one rotor which can rotate about a vertical axis and, between two horizontal mounting planes, which are located one above the other and separated, a plurality of rotor blades, which are arranged distributed on a circumferential circle and can each pivot about a vertical pivoting axis extending between said two horizontal mounting planes, and whose pivoting range is bounded at both ends by a stop, wherein the width of the rotor blades is less than ⅓ of the radius of the circumferential circle;

said mounting planes are formed by wheels which rotate about said vertical axis, the at least one rotor is connected via a shaft to a generator unit;

the rotor blades have an aerodynamic cross-sectional profile with a pointed end and a round end;

the pivoting axes of the rotor blades are arranged within the rotor blades and spaced at a distance near the round end; and the pivoting range of the rotor blades is in each case defined by a single stop which is arranged within the rotor blade, rotationally fixed with respect to the pivoting axis.

* * * * *

UNITED STATES PATENT AND TRADEMARK OFFICE
CERTIFICATE OF CORRECTION

PATENT NO. : 8,552,579 B2  Page 1 of 1
APPLICATION NO. : 12/811133
DATED : October 8, 2013
INVENTOR(S) : Patrick Richter It is certified that error appears in the above-identified patent and that said Letters Patent is hereby corrected as shown below:

In the Claims

Column 7, Line 59, Claim 3, delete "straijht" and insert -- straight --

Signed and Sealed this
Third Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,552,579 B2
APPLICATION NO. : 12/811133
DATED             : October 8, 2013
INVENTOR(S)       : Richter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 478 days.

Signed and Sealed this

Fifteenth Day of September, 2015

Michelle K. Lee
*Director of the United States Patent and Trademark Office*